United States Patent
DuBois et al.

(10) Patent No.: US 6,316,112 B1
(45) Date of Patent: Nov. 13, 2001

(54) FLUORO-FUNCTIONAL POLYETHYLENE-POLYSILOXANE BLOCK COPOLYMERS

(75) Inventors: Donn Anthony DuBois, Houston, TX (US); Jeffrey George Southwick, Waterloo (BE); Ronald James Hoxmeier, Houston, TX (US); John Allen, Pasadena, CA (US)

(73) Assignees: Kraton Polymers US LLC, Houston, TX (US); Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/442,221

(22) Filed: Nov. 17, 1999

Related U.S. Application Data

(60) Provisional application No. 60/109,856, filed on Nov. 24, 1998.

(51) Int. Cl.$^7$ ............................. B82B 27/28; B82B 27/32
(52) U.S. Cl. ........................ 428/447; 428/516; 428/41.4; 525/92 G; 525/100; 525/106; 528/41
(58) Field of Search ................... 525/106, 92 G, 525/100; 428/41.4, 447, 516; 528/41

(56) References Cited

U.S. PATENT DOCUMENTS

| | | | |
|---|---|---|---|
| 3,873,636 | * | 3/1975 | Saam et al. . |
| 5,229,179 | * | 7/1993 | Kumar et al. . |
| 5,300,609 | | 4/1994 | Kobayashi .............................. 528/14 |
| 5,401,822 | * | 3/1995 | Collins et al. . |
| 5,618,903 | | 4/1997 | Hoxmeier et al. ...................... 528/14 |
| 5,696,219 | * | 12/1997 | Jallouli et al. . |
| 5,728,469 | * | 3/1998 | Mann et al. . |

OTHER PUBLICATIONS

*Makromol. Chem.*, 194(5), pp. 1403–1410.

* cited by examiner

*Primary Examiner*—Robert Dawson
*Assistant Examiner*—Marc S. Zimmer

(57) ABSTRACT

This invention relates to anionically polymerized block copolymers comprised of at least one block of polyethylene and at least one block of a polymerized cyclic siloxane monomer wherein said cyclic siloxane monomer contains at least one functional group containing a fluorocarbon substituent, e.g., 2,4,6-tris(3,3,3-trifluoropropyl)-1,3,5-trimethylcyclotrisiloxane. The fluoro-functionality may instead be introduced into the polymer by using said siloxane monomer to end cap the polymer. These copolymers can be used in extruded release coating films prepared by blending the copolymer with a film grade polymer. They can also be used to modify surface adhesion, promote flow in polymer processing or coat a polymeric surface to impart properties such as a barrier to water vapor transmission, or solvent resistance.

10 Claims, No Drawings

FLUORO-FUNCTIONAL POLYETHYLENE-POLYSILOXANE BLOCK COPOLYMERS

This application claims the benefit of U.S. Provisional Application No. 60/109,856, filed Nov. 24, 1998, the entire disclosure of which is hereby incorporated by reference.

FIELD OF THE INVENTION

This invention relates to anionically polymerized fluoro-functional polyethylene/cyclic siloxane block copolymers for use in release coatings.

BACKGROUND OF THE INVENTION

Linear block copolymers of polystyrene and polydimethylsiloxane have been synthesized, both by graft and block copolymerization. In block copolymerization of such linear polymers, polystyrene is produced by anionic polymerization with an organo lithium initiator and the living polymer ($PS^-Li^+$) created thereby is reacted with hexamethylcyclotrisiloxane, $(Me_2SiO)_3$, in the presence of a polar promoter wherein a block of polydimethylsiloxane (PDMS) grows on the end of the living polystyrene block. These polymers are useful for impact modification of engineering thermoplastics and forming coatings with low energy surfaces. PDMS exhibits superior heat resistance, low-temperature flexibility, weather resistance, chemical inertness.

U.S. Pat. No. 5,618,903 describes an anionically polymerized polyethylene(PE)-PDMS block copolymer with increased molecular weight, strength, service temperature stability and purity. The PE blocks exhibit the high level of crystallinity and high melting point of high density polyethylene and thus give higher strength and service temperature capability to the block copolymers.

U.S. Pat. No. 5,300,609 describes a fluorosilicone block copolymer useful in silicone/fluorosilicone rubber mixtures. These fluorinated siloxane polymers have two major advantages over a non-fluorinated siloxane. One is their lower surface tension property and the other is their more chemical resistant nature. In *Makromol. Chem.*, 194(5), 1403–10, Kobayashi describes a polydimethylsiloxane-poly(methyl-3,3,3-trifluoropropyl-siloxane) copolymer blend having improved fuel and oil resistance over PDMS polymers. These fluorosilicone elastomers are prepared as both random and block copolymers using anionic living polymerization techniques. They do not, however, have a polyolefin block that exhibits the high level of crystallinity and high melting point of high density polyethylene necessary to give the polymer higher strength and service temperature capability.

Thus it can be seen that it would be advantageous to be able to produce a block copolymer with the characteristics of the PE-PDMS described in the '903 patent in addition to heat, weather and chemical resistance, and low temperature flexibility. PE-PDMS copolymers when coextruded with polyethylene and other polyolefins quickly migrate to the surface, leaving in effect, a surface coated with the low-surface energy PDMS block. However, in some cases PE-PDMS polymers are not sufficiently efficient in migration rates to the surface in the time frame of residence time in the extruder. This leads to unacceptable utilization levels of these high value materials. The present invention describes a copolymer that meets these needs and is highly useful in release coatings. The fluoro-containing PE-PDMS polymers of this invention impart both a stronger driving force to the surface and faster migration (more efficient use).

SUMMARY OF THE INVENTION

The present invention is a living fluoro-functionalized anionically polymerized block copolymer comprising at least one anionically polymerized block of polyethylene (PE) and at least one anionically polymerized block of a cyclic siloxane monomer. In one embodiment, the cyclic siloxane monomer contains at least one functional group containing a fluorocarbon substituent. The siloxane polymer block may also be a random copolymer of a cyclic siloxane monomer without a fluorocarbon substituent along with the siloxane monomer that has such a substituent. In another embodiment, the fluoro-functionality is provided by end-capping (terminating) the polymer with a small polymer block derived from a cyclic siloxane monomer containing at least one functional group containing a fluorocarbon substituent.

In a preferred embodiment, the cyclic siloxane monomers have the formula:

$$(R_1R_2SiO)_n$$

wherein n is from 3–10 and $R_1$ and $R_2$ are, independently, alkyl having 20 or less carbon atoms alkenyl having 20 or less carbon atoms, hydrogen, benzyl, phenyl, alkyl substituted aromatics. In the case of the fluoro-functionalized monomer, at least one $R_1$ or $R_2$ group contains a fluorocarbon substituent.

The present invention also encompasses a release coating prepared by extruding a release film comprising a blend of a film grade polymer and a polyethylene-fluorofunctionalized siloxane block copolymer, as described above.

DETAILED DESCRIPTION OF THE INVENTION

In general, when solution anionic techniques are used, polymers of anionically polymerizable monomers are prepared by contacting the monomer to be polymerized simultaneously or sequentially with an anionic polymerization initiator such as Group IA metals, their alkyls, amides, silanolates, naphthalides, biphenyls and anthracenyl derivatives. It is preferable to use an organo alkali metal (such as sodium or potassium) compound in a suitable solvent at a temperature within the range from −150° C. to 300° C. preferably at a temperature within the range from 0° C. to 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to 20 carbon atoms; and n is an integer of 1–4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

Ethylene may be polymerized as described above with the addition that it is usually best to include a promoter, such as a diamine, to facilitate the reaction. Examples of these amines which include but are not limited to follow: N,N,N',N'-tetramethylmethylenediamine (TMMDA), N,N,N',N'-tetramethylethylenediamine (TMEDA), N,N,N',N'-tetraethylethylenediamine (TEEDA), N,N,N',N'-tetramethyl-1,3-propanediamine (TMPDA), N,N,N',N'tetramethyl-1,4-butanediamine (TMBDA), dipiperidinomethane (DIPIM), 1,2-dipiperidinoethane (DIPIE), 1,8-bis(dimethylamino)-naphthalene, N,N,N',N'tetramethyl-o-phenylenediamine (TMOPDA), 1,2-dipyrolidinoethane (DIPIP), 1,3-dipiperidino-propane (DIPIP), 1,2-bis(2.6-dimethylpiperidino)cyclohexane (BDMPC), sparteine, and the like.

The ethylene polymerization reaction can be carried out at 0° C. to 100° C. preferably 25° C. to 60° C. The ethylene pressure can be from 10 psig to 1000 psig, preferably 100 to 500 psig. The polymerization time can run from 10 minutes to 2 hours, preferably 30 minutes to 1 hour.

When the polymerization of the ethylene is complete, living polyethylene blocks are present in the polymerization mixture. These are perfectly linear polyethylene-alkyllithiums. These living polyethylenes can then be reacted with cyclic siloxane monomers such as those of the formula $(R_1R_2SiO)_n$, where n is from 3–10, $R_1$ and $R_2$ are, independently, alkyl having 20 or less carbon atoms alkenyl having 20 or less carbon atoms, hydrogen, benzyl, phenyl, alkyl substituted aromatics. Specific siloxane monomers include $(Me_2SiO)_3$, $(MeHSiO)_3$, $(Me_2SiO)_4$, $(Me_2SiO)_5$, $(MeHSiO)_4$, $(MeHSiO)_5$, $(Ph_2SiO)_3$, $(Ph_2SiO)_4$, $(Ph_2SiO)_5$, $(PhHSiO)_4$, $(PhHSiO)_5$, $(PhHSiO)_3$, $(vinylmethylSiO)_4$, $(vinylmethylSiO)_5$, $(vinylHSiO)_3$, $(vinylHSiO)_4$, $(vinylHSiO)_5$, $(vinylmethylSiO)_{31}$ $(PhMeSiO)_3$, $(PhMeSi)_4$, $(PhMeSiO)_5$ Mixtures of monomers can also be used. Because they contain no fluoro-functionality, these block copolymers have to be capped with a block derived from a cyclic siloxane monomer having a fluorocarbon substituent as described below.

The living polyethylenes could instead be copolymerized with a siloxane monomer as described in the preceding paragraph with the addition that one of the comonomers must contain a fluorocarbon substituent. For example, in a preferred embodiment, the comonomer is of the formula $(R_1R_2SiO)_n$ as described above and at least one of $R_1$ and $R_2$ must contain a fluorocarbon substituent. Specific examples of such monomers include 1,3,5-tris(3,3,3-trifluoropropyl)-1,3,5-trimethylcyclotrisiloxane. This monomer can be polymerized to form a homopolymer block or it can be copolymerized with such siloxane monomers which do not have a flurocarbon substituent to form a random copolymer block.

This polymerization is carried out in the presence of a polar promoter, including, but not limited to, the promoter present during the ethylene polymerization step. Additional promoter can be added. Such promoters include but are not limited to diethers and/or diamines, such as diethylglyme andor TMEDA, cyclic ethers such as tetrahydrofuran, and any promoter known to be useful in anionic polymerization. Its purpose is to decrease the reaction time of the siloxane polymerization. Preferably, this reaction is carried out at a temperature of from 30° C. to 120° C., the concentration of the siloxane monomer is from 1 to 80 percent by weight, and the amount of promoter used ranges from 100 ppm to essentially 100 percent by weight (i.e. the polar promoter is used as solvent). The temperature range is important because higher temperatures cause more rapid reaction. The promoter concentration range is important for the same reason.

The reaction may be carried out at up to 80 weight percent solids, preferably 10 to 80 percent. This is advantageous because higher solids offer economic advantages because less solvent is necessary.

The living block copolymer can be recovered directly to give, for example, polyethylene-polyl1,3,5-tris(3,3,3-trifluoropropyl)-1,3,5-trimethylsiloxane or polyethylene-polydimethylsiloxane-co-polyl,3,5-tris(3,3,3-trifluoropropyl)-1,3,5-trimethylsiloxane, or polyethylene-polydimethylsiloxane-polyl,3,5-tris(3,3,3-trifluoropropyl)-1,3,5-trimethylsiloxane which are living polymers and have not been terminated. One could manufacture and sell the living polymer itself to others that could then react it to form other polymers and/or add other functionalities. Termination of the polymer may be achieved by well known conventional means.

When the block copolymer is made with a cyclic siloxane monomer which does not contain a fluorocarbon substituent, it must be capped (terminated) with such a monomer which does contain a fluorocarbon substituent. This reaction creates a small polymer block of the monomer at the end of the polymer. This generally contains 1 to 20 monomer units. The capping reaction can be carried out from 40 to 100° C. for 5 minutes to 1 hour, preferably 70 to 100° C. for about 10 to 15 minutes.

By adding fluorocarbon functionality, in the form of a fluoro-containing siloxane monomer such as 1,3,5-tris(3,3,3-trifluoropropyl)-1,3,5-trimethylcyclotrisiloxane, several key properties of these copolymers are improved, including lowering the surface energy of the siloxane phase and augmenting hydrocarbon solvent resistance as well as improving migration rates to a melt surface (efficiency).

EXAMPLES

Example 1

PE Polymerization 300 g of cyclohexane and 1.5 ml of N,N,N',N'-tetramethylethylenediamine (TMEDA) were mixed in a 1 liter autoclave. Said autoclave was purged with nitrogen for 5 minutes. To this were added 6.88 ml of 1.6 m n-butyl lithium (n-Buli). The autoclave was pressured to 250 psig with ethylene gas and the reaction was allowed to exotherm from ambient temperature to 50° C. and then maintained at that temperature. About 45 g of ethylene was added during the reaction time. Upon completion of the PE reaction, the contents of the autoclave were stirred for an additional 30 minutes with an ethylene blanket above the solution. The ethylene was then vented off and the autoclave was purged with nitrogen. A sample of PE was withdrawn for testing. Crossover reaction from living PE-Li block to the silane block and polymerization of the silane block.

30g of 1,3,5-tris(3,3,3-trifluoropropyl)-1,3,5-trimethylcyclotrisiloxane in 100 g of cyclohexane were added to the PE-Li in the autoclave and the reaction temperature was raised to 84° C. for 45–60 minutes. Then 79 g of tertrahydrofuran (THF), 50 g of cyclohexane and an additional 30 g of 1,3,5-tris(3,3,3-trifluoropropyl)-1,3,5-trimethylcyclotrisiloxane was added to the reactor and heated at 84° C. for 120 minutes. The polymerization was then terminated by charging 2 ml of methanol into the reactor to terminate the polymer and the copolymer was recovered.

Example 2

PE Polymerization 300 g of cyclohexane and 7.55 ml of N,N,N',N'-tetramethylethylenediamine (TMEDA) were mixed in a 1 liter autoclave. Said autoclave was purged with nitrogen for 5 minutes. To this was added 22 g of 1.6 m n-butyl lithium (n-Buli). The autoclave was pressured to 250 psig with ethylene gas and the reaction was allowed to exotherm from ambient temperature to 60° C. and then maintained at that temperature. About 60 g of ethylene was added during the reaction time. Upon completion of the PE reaction, the contents of the autoclave were stirred for an additional 30 minutes with an ethylene blanket about the solution. The ethylene was then vented off and the autoclave was purged with nitrogen. A sample of PE was withdrawn for testing.

Purification of Hexamethylcyclotrisiloxane Monomer (D3)

A 50 percent by weight solution of hexamethylcyclotrisiloxane in treated cyclohexane was prepared, treated with hot 4A mole sieves and alumina for 1 hour under agitation, filtered and stored under nitrogen. This procedure was standard although satisfactory results can be obtained by using hexamethylcyclotrisiloxane as received from vendors (purity 95–99%).

Crossover Reaction from Living PE-Li Block to the Polydimethylsiloxane (PDMS) Block and Polymerization of the PDMS Block 75 g of the siloxane monomer in cyclohexane was added to the PE-Li$^+$ in the autoclave and the reaction temperature was heated to about 80° C. and maintained at 80° C. to 84° C. for 45 minutes. Then 77 g of THF, 20 g of cyclohexane and an additional 75 g of the siloxane monomer were added to the autoclave. This solution was heated at 80° C. to 84° C. for 50 minutes to allow the siloxane monomer to polymerize giving a PE—PDMS—Li living polymer.

End-capping with Fluorosiloxane Monomer 23.4 g of 1,3,5-tris(3,3,3-trifluoropropyl)-1,3,5-trimethylcyclotrisiloxane 30 g of cyclohexane was then charged into the autoclave. The solution was heated at 80° C. to 84° C. for 45 minutes to allow the monomer to polymerize on the end of the PDMS block. The polymerization was terminated by charging 10 ml of methanol into the autoclave, leaving a final product with a fluoro end block containing one cyclic siloxane monomer unit.

Release Coating Testing 1 percent by weight and 3 percent by weight of this capped block copolymer was added to a low molecular weight polyethylene wax. This mixture was then tested for silicone release values and silicone transfer values.

The silicone release value test is carried out as follows:

Sample Preparation:
1. 4 inch wide by 10 inch long Kraft paper is secured with tape to a 4 inch by 12 inch PYREX® glass plate;
2. the plate and a 0.0015 inch DOCTOR® blade is placed in a 120° C. convection oven;
3. 1 percent by weight and 3 percent by weight polymer are weighed into beakers with SHELLMAX® 400 polyethylene wax;
4. the beakers are placed in the oven to melt the samples;
5. the temperature is raised in 20° C. increments until the polymer melts in the wax;
6. if the polymer has not melted at 220° C., the test cannot be performed on that sample;
7. the melted sample is cast on the Kraft paper using the 0.0015 inch blade; and
8. the cast plate is allowed to sit for 24 or 72 hours before testing.

Testing:
1. 1 inch wide by 4 inch long packaging tape is placed on a rectangle of the Kraft paper sample;
2. the sample is rolled down one time by an automatic rolling machine;
3. the sample is placed in the jaws of an Instron and pulled apart at a speed of 12 inches per minute; and
4. the strength of the T-pull is recorded in grams of force per inch necessary to separate the tape from the sample.

Lower values are desirable because the lower the value, the less energy is needed to separate the label from the release liner.

The silicone transfer value test is carried out as follows:
1. a piece of packaging tape 2 inches wide by 4 or 5 inches long is placed on the Kraft paper sample from above;
2. the sample is rolled down one time with a 4 pound hand roller;
3. the tape is removed from the sample and placed sticky side up on a glass plate and secured on the ends;
4. 2 microliters of isopropanol (IPA) from an automatic pipet is placed on the tape in 3 different locations;
5. the IPA is allowed to evaporate;
6. the diameter of the IPA spot is measured in mm.

Higher values are desired because this indicates that less silicone was transferred from the release paper to the label and therefore the label will perform better.

The results are shown in the following table:

TABLE 1

| Percent Polymer in Wax | Days from Casting to Testing | T-Pulls (Average Grams Per Inch) | Silicone Transfer Test (mm) |
| --- | --- | --- | --- |
| 1 | 1 | 70.3 | 8.2 |
| 1 | 3 | 47.7 | — |
| 3 | 1 | 52.2 | 7.8 |
| 3 | 3 | 31.8 | — |

The foregoing fluorocarbon substituent containing polymers compare favorably to similar polymers which do not contain fluorocarbon substituents in that the silicone transfer values are relatively high comparatively while the silicone release values are generally lower. The following table shows similar test results for a series of polyethylene-polydimethylsiloxane block copolymers which do not contain fluorocarbon functionality.

TABLE 2

| Polymer | Percent Polymer in Wax | Days from Casting to Testing | T-Pulls (Average Grams Per Inch) | Silicone Transfer Test (mm) |
| --- | --- | --- | --- | --- |
| 11U | 1 | 1 | 90.6 | 10.7 |
| 11U | 3 | 1 | 79.3 | 9.3 |
| 11C | 1 | 1 | 45.3 | 8.8 |
| 11C | 3 | 1 | 45.4 | 6.7 |
| 13U | 1 | 1 | 66.5 | 10.5 |
| 13U | 3 | 1 | 87.6 | 7.5 |
| 14BF | 1 | 1 | 226.5 | 11.2 |
| 14BF | 3 | 1 | 77.0 | 7.5 |
| 14BU | 1 | 1 | 106.5 | 9.5 |
| 14BU | 3 | 1 | 63.4 | 8.2 |
| 14AF | 1 | 1 | 197.1 | 10.3 |
| 14AF | 3 | 1 | 131.4 | 9.7 |
| 14AU | 1 | 1 | 287.7 | 9.2 |
| 14AU | 3 | 1 | 219.7 | 7.3 |

We claim:
1. A living anionically polymerized block copolymer comprising at least one anionically polymerized block of polyethylene and at least one anionically polymerized block of a cyclic siloxane monomer wherein said cyclic siloxane monomer is 1,3,5-tris(3,3,3-trifluoropropyl)-1,3,5-trimethylcyclotrisiloxane.

2. The copolymer of claim 1 wherein the cyclic siloxane monomer with a fluorocarbon substituent is copolymerized with a cyclic siloxane monomer which has no fluorocarbon substituent.

3. A living anionically polymerized block copolymer comprising at least one anionically polymerized block of polyethylene and at least one anionically polymerized block of a cyclic siloxane monomer wherein said copolymer is capped with a polymer block derived from a cyclic siloxane monomer which contains at least one functional group containing a fluorocarbon substituent.

4. The copolymer of claim 3 wherein the cyclic siloxane monomer with a fluorocarbon substituent has the formula:

$$(R_1R_2SiO)_n$$

wherein n is from 3–10 and $R_1$ and $R_2$ are, independently, alkyl having 20 or less carbon atoms alkenyl having 20 or less carbon atoms, hydrogen, benzyl, phenyl, alkyl substituted aromatics or polycyclics such that at least one $R_1$ or $R_2$ group contains a fluorocarbon substituent.

5. The copolymeer of claim 4 wherein the cyclic siloxane monomer is 1,3,5-tris(3,3,3-triflluoropropyl-1,3,5-trimethylcyclotrisiloxane.

6. A release coating prepared by extruding a release film comprising a blend of a film grade polymer and a fluorosilozane-containing copolymer, said copolymer comprised of at least one anionically polymerized block of polyethylene and at least one anionically polymerized block of cyclic silonxane monomer wherein said cyclic siloxane monomer is 1,3,5-tris(3,3,3-trifluoropropyl)-1,3,5-trimethylcyclotrisiloxane.

7. The release coating of claim 6 wherein the cyclic siloxane monomer with a fluorocarbon substituent is copolymerized with a cyclic siloxane monomer which has no fluorocarbon substituent.

8. A release coating prepared by extruding a release film comprising a blend of a film grade polymer and a fluorosiloxane-containing copolymer, said copolymer comprised of at least one anionically polymerized block of polyethylene and at least one anionically polymerized block of a cyclic siloxane monomer wherein said copolymer is capped with a polymer block derived from a cyclic siloxane monomer which contains at least one functional group containing a fluorocarbon substituent.

9. The release coating of claim 8 wherein the cyclic siloxane monomer with a fluorocarbon substituent has the formula:

$$(R_1R_2SiO)_n$$

wherein n is from 3–10 and $R_1$ and $R_2$ are, independently, alkyl having 20 or less carbon atoms, alkenyl having 20 or less carbon atoms, hydrogen, benzyl, phenyl, alkyl substituted aromatics or polycyclics such that at least one $R_1$ or $R_2$ group contains a fluorocarbon substituent.

10. The release coating of claim 9 wherein the cyclic siloxane monomer is 1,3,5-tris(3,3,3-trifluoropropyl)-1,3,5-trimethylcyclotrisiloxane.

* * * * *